US008886554B2

(12) United States Patent
Chatterjee et al.

(10) Patent No.: US 8,886,554 B2
(45) Date of Patent: Nov. 11, 2014

(54) AD REDEMPTION

(75) Inventors: Surojit Chatterjee, Fremont, CA (US);
Anita Krishnakumar, San Mateo, CA (US); Ping Wu, San Bruno, CA (US)

(73) Assignee: Google Inc., Mountain View, CA (US)

( * ) Notice: Subject to any disclaimer, the term of this patent is extended or adjusted under 35 U.S.C. 154(b) by 446 days.

(21) Appl. No.: 12/778,071

(22) Filed: May 11, 2010

(65) Prior Publication Data

US 2011/0282725 A1 Nov. 17, 2011

(51) Int. Cl.
*G06Q 30/00* (2012.01)
*G06Q 30/02* (2012.01)

(52) U.S. Cl.
CPC ............ *G06Q 30/02* (2013.01); *G06Q 30/0223* (2013.01); *G06Q 30/0225* (2013.01); *G06Q 30/0235* (2013.01); *G06Q 30/0238* (2013.01)
USPC .......................................... 705/14.1

(58) Field of Classification Search
CPC ..................................... G06Q 90/00
USPC ....................................... 705/14.1
See application file for complete search history.

(56) References Cited

U.S. PATENT DOCUMENTS

| 2008/0248815 | A1* | 10/2008 | Busch ...................... 455/456.5 |
| 2009/0288012 | A1 | 11/2009 | Hertel et al. |
| 2010/0137053 | A1* | 6/2010 | Blair et al. ..................... 463/17 |
| 2011/0282725 | A1 | 11/2011 | Chatterjee et al. |

OTHER PUBLICATIONS

Lam, B., AU Office Action issued in Application No. 2011250944, pp. 1-2, Jul. 16, 2013.

* cited by examiner

*Primary Examiner* — Daniel Lastra
(74) *Attorney, Agent, or Firm* — Johnson, Marcou & Isaacs, LLC (57) ABSTRACT

This specification describes technologies relating to content presentation. In general, one aspect of the subject matter described in this specification can be embodied in methods that include the actions of sending one or more redeemable content items to a user, each content item being configured for redemption at a physical retail location; receiving a request from the user to redeem a content item of the one or more content items at a particular physical retail location; validating, using one or more processor, the content item for redemption; if the content item is valid for redemption, notifying a corresponding retailer of the content item redemption to be applied to a pending retail transaction; and logging the redemption. Other embodiments of this aspect include corresponding systems, apparatus, and computer program products.

36 Claims, 5 Drawing Sheets

AD REDEMPTION

BACKGROUND

The present disclosure relates to content presentation.

Advertisers provide advertisements in different forms in order to attract consumers. An advertisement ("ad") is a piece of information designed to be used in whole or part by a user, for example, a particular consumer. Ads can be provided in electronic form. For example, online ads can be provided as banner ads on a web page, as ads presented with search results, or as ads presented in a mobile application.

One can refer to the inclusion of an ad in a medium, e.g., a webpage or a mobile application, as an impression. An advertising system can include an ad in a webpage, for example, in response to one or more keywords in a user search query input to a search engine. If a user selects the presented ad (e.g., by "clicking" the ad), the user is generally taken to another location associated with the ad, for example, to another, particular web page.

SUMMARY

This specification describes technologies relating to content presentation.

In general, one aspect of the subject matter described in this specification can be embodied in methods that include the actions of sending one or more redeemable content items to a user, each content item being configured for redemption at a physical retail location; receiving a request from the user to redeem a content item of the one or more content items at a particular physical retail location; validating, using one or more processor, the content item for redemption; if the content item is valid for redemption, notifying a corresponding retailer of the content item redemption to be applied to a pending retail transaction; and logging the redemption. Other embodiments of this aspect include corresponding systems, apparatus, and computer program products.

These and other embodiments can optionally include one or more of the following features. The content item is an advertisement. The content item includes location information associating the content item with a particular location. Validating the content item includes confirming that the content item has not already been redeemed. Validating the content item includes confirming that the content item has not expired. Validating the content item includes confirming that the content item is available for redemption.

In general, one aspect of the subject matter described in this specification can be embodied in methods that include the actions of receiving one or more content items and storing the one or more content items for later redemption; receiving a user input selecting a content item of the one or more content items for redemption; activating, using one or more processors, the content item; transmitting a redemption message to redeem the ad; and deactivating the content item. Other embodiments of this aspect include corresponding systems, apparatus, and computer program products.

These and other embodiments can optionally include one or more of the following features. where the content item is an advertisement. The received content items are stored on a mobile device. The received content items are stored in a remote location accessible by a mobile device. A content item is associated with a geographic location. The method further includes prompting the user to select the content item when the user is located in proximity to the geographic location associated with the content item. Activating the ad includes receiving a user touch input to a presented activate button. Activating the ad includes shaking a mobile device. The method further includes presenting the ad for scanning Presenting the ad for scanning includes displaying a bar code associated with the content item. The method further includes detecting one or more light inputs after activating the content item, where the redemption message is transmitted following the detection of the one or more light inputs.

Particular embodiments of the subject matter described in this specification can be implemented to realize one or more of the following advantages. Content (e.g., ad) redemption is improved by making redemption of content at physical locations easier. For example, a user can redeem content presented on a mobile device at a point of sale system. Content redemption tracking is improved by capturing content redemptions occurring a physical retail locations rather than an electronic storefront.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference symbols in the various drawings indicate like elements.

DETAILED DESCRIPTION

Offline conversions of electronic content items (e.g., advertisements) can refer, for example, to conversions that occur when a user views a content item online, but performs some conversion event at another physical location (e.g., a retail store location). Thus, an offline conversion location can refer to a physical location in contrast to an electronic storefront, e.g., as a web page store, even though the transaction may still use network communications between the store and one or more network locations. A user can view a content item associated with a particular product (e.g., presented on a web page or with search result listings) and then purchase that product at a physical store. In some implementations, a content item can be redeemed at a particular retailer in order to receive a benefit, for example, a particular discount for an item or service identified by the content item.

A user can activate the content item at a point of sale location in order to redeem the content item accessed though the user's mobile device. The content item can contact a management system that validates that content item and communicates with a retailer at the point of sale location in order to indicate redemption. The retailer can then apply the benefit identified by the content item (e.g., the discount). Following redemption, the content item can become deactivated in order to prevent further redemption. The management system can log the redemption in order to track redemptions of the content item and to prevent unauthorized redemptions of the content item.

While reference will be made below to advertising systems and methods, other forms of content including other forms of sponsored content can be managed, presented, and tracked in accordance with the description below.

Figure 1:
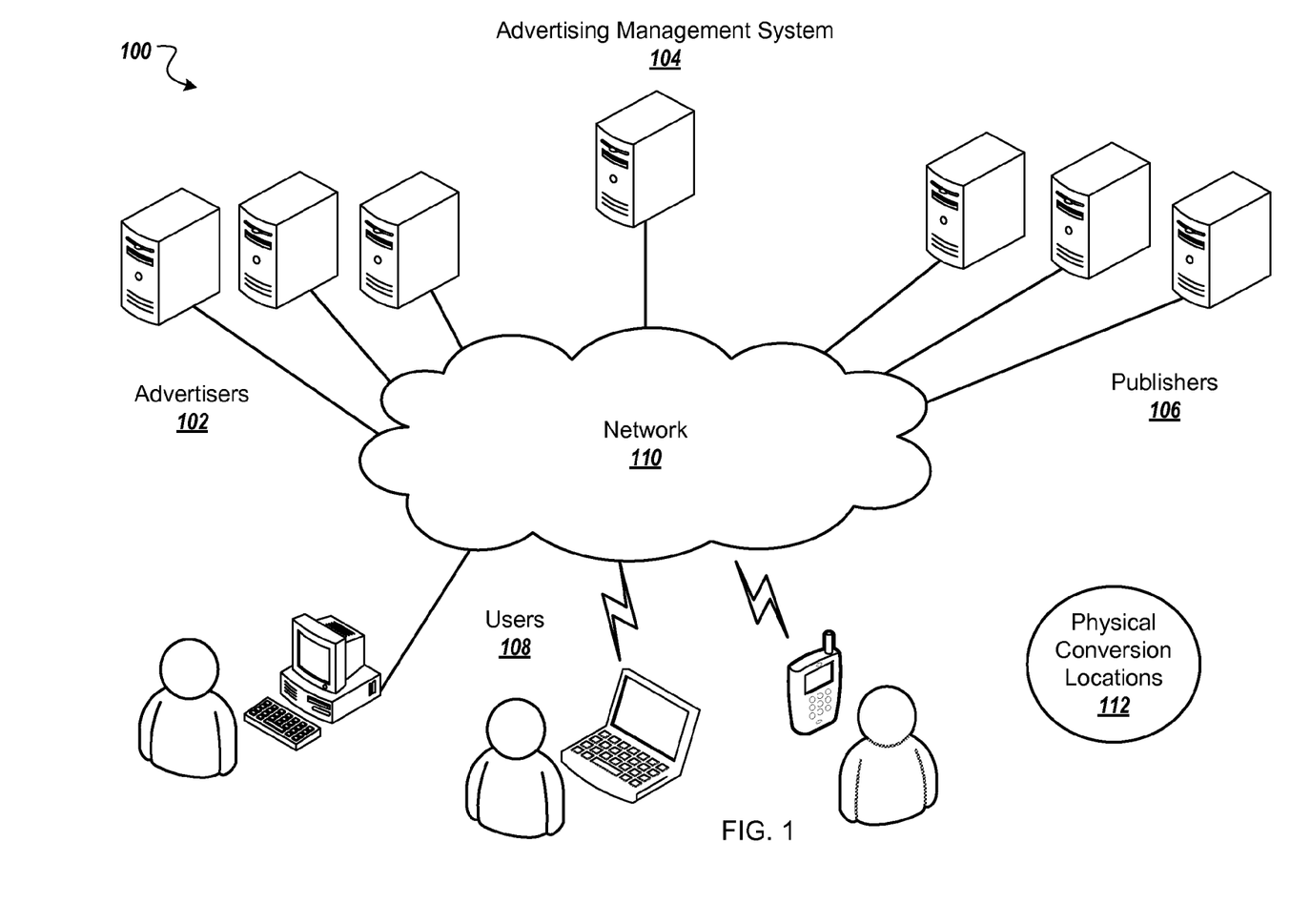
FIG. 1 is a block diagram of an example content presentation system.

FIG. 1 is a block diagram of an example content presentation system 100. In some implementations, one or more advertisers 102 can directly, or indirectly, enter, maintain, and track ad information in an advertising management system 104. Though reference is made to advertising, other forms of content, including other forms of sponsored content, can be delivered by the system 100. The ads can be in the form of graphical ads, such as banner ads, text only ads, barcode ads (e.g., an ad including one or more barcodes which can be used in redeeming and/or tracking the ad), image ads, audio ads, video ads, animated ads, ads combining one or more of any of such components, etc. The ads can also include embedded information, such as links, meta-information, and/or machine executable instructions. One or more publishers 106 can submit requests for ads to the advertising management system 104. The advertising management system 104 responds by sending ads to the requesting publisher 106 for placement on or association with one or more of the publisher's content items (e.g., web properties). Example web properties can include web pages, television and radio advertising slots, or print media space.

Other entities, such as users 108 and the advertisers 102, can provide usage information to the advertising management system 104, such as, for example, whether or not a conversion (e.g., a purchase or other interaction) or a click-through related to an ad (e.g., a user has selected an ad) has occurred. This usage information can include measured or observed user behavior related to ads that have been served. The advertising management system 104 can perform financial transactions, for example, crediting the publishers 106 and charging the advertisers 102 based on the usage information.

A network 110, such as a local area network (LAN), wide area network (WAN), the Internet, one or more telephony networks or a combination thereof, connects the advertisers 102, the advertising management system 104, the publishers 106, and the users 108.

One example publisher 106 is a general content server that receives requests for content (e.g., articles, discussion threads, music, video, graphics, search results, web page listings, information feeds, etc.), and retrieves the requested content in response to the request. The content server can submit a request for ads to an advertisement server in the advertising management system 104. The ad request can include a number of ads desired. The ad request can also include content request information. This information can include the content itself (e.g., page, video broadcast, radio show, or other type of content), a category corresponding to the content or the content request (e.g., arts, business, computers, arts-movies, arts-music, etc.), part or all of the content request, content age, content type (e.g., text, graphics, video, audio, mixed media, etc.), geo-location information, etc.

In some implementations, the content server or a client browser combines the requested content with one or more of the ads provided by the advertising management system 104. The combined content and ads can be sent/rendered to the users 108 that requested the content for presentation in a viewer (e.g., a browser or other content display system). The content server can transmit information about the ads back to the advertisement server, including information describing how, when, and/or where the ads are to be rendered (e.g., in HTML or JavaScript™)

Another example publisher 106 is a search service. A search service can receive queries for search results. In response, the search service can retrieve relevant search results from an index of documents (e.g., from an index of web pages). Search results can include, for example, lists of web page titles, snippets of text extracted from those web pages, and hypertext links to those web pages, and can be grouped into a predetermined number of (e.g., ten) search results.

The search service can submit a request for ads to the advertising management system 104. The request can include a number of ads desired. This number can depend, for example, on the search results, the amount of screen or page space occupied by the search results, the size and shape of the ads, etc. The request for ads can also include the query (as entered or parsed), information based on the query (such as geo-location information, whether the query came from an affiliate and an identifier of such an affiliate), and/or information associated with, or based on, the search results. Such information can include, for example, identifiers related to the search results (e.g., document identifiers or "docIDs"), scores related to the search results (e.g., information retrieval ("IR") scores), snippets of text extracted from identified documents (e.g., web pages), full text of identified documents, feature vectors of identified documents, etc. In some implementations, IR scores are computed from, for example, dot products of feature vectors corresponding to a query and a document, page rank scores, and/or combinations of IR scores and page rank scores, etc.

In some implementations, the advertising management system 104 can use an auction process to select ads from the advertisers 102. For example, the advertisers 102 can be permitted to select, or bid, an amount the advertisers 102 are willing to pay for each presentation of or interaction with (e.g., click) of an ad, e.g., a cost-per-click amount an advertiser pays when, for example, a user clicks on an ad. The cost-per-click can include a maximum cost-per-click, e.g., the maximum amount the advertiser is willing to pay for each click of an ad based on a keyword, e.g., a word or words in a query. Other bid types, however, can also be used. Based on these bids, ads can be selected and ranked for presentation.

The search service can combine the search results with one or more of the ads provided by the advertising management system 104. This combined information can then be forwarded to the users 108 that requested the content. The search results can be maintained as distinct from the ads, so as not to confuse the user between paid ads and presumably neutral search results.

In some implementations, one or more publishers 106 submit requests for ads to the advertising management system 104. The advertising management system 104 responds by sending ads to the requesting publisher 106 for placement on one or more of the publisher's web properties (e.g., websites and other network-distributed content) that are relevant to the web property. For example, if a publisher 106 publishes a sports-related web site, the advertising management system 104 can provide sports-related ads to the publisher 106. In some implementations, the requests can instead be executed by devices associated with the user 108, e.g., by the execution of a particular script (e.g., javascript) when the publisher's web page is loading on a client device.

Another example publisher 106 is a mobile application developer. A mobile application is an application specifically designed for operation on a mobile device (e.g., a smart phone). The mobile application can also include ads positioned within the content of the mobile application. Similar to publishers 106 described above, the ads can be received from the advertising management system 104 for placement in the mobile application when accessed by a user (e.g., when a particular page of a mobile application is loaded on the mobile device).

In some implementations, conversions can occur at physical retail locations e.g., at physical conversion locations 112. A conversion can be a user action of interest to the advertiser (e.g., making a purchase or redeeming a discount at a particular retail or other point of sale location). Advertisers can measure the effectiveness of advertising campaigns based on the conversions that occur relative to the presented advertisements. However, if the user 108 views an ad on a device and then travels to a store to make a purchase, it can be difficult to link the conversion to the advertisement.

Figure 2:
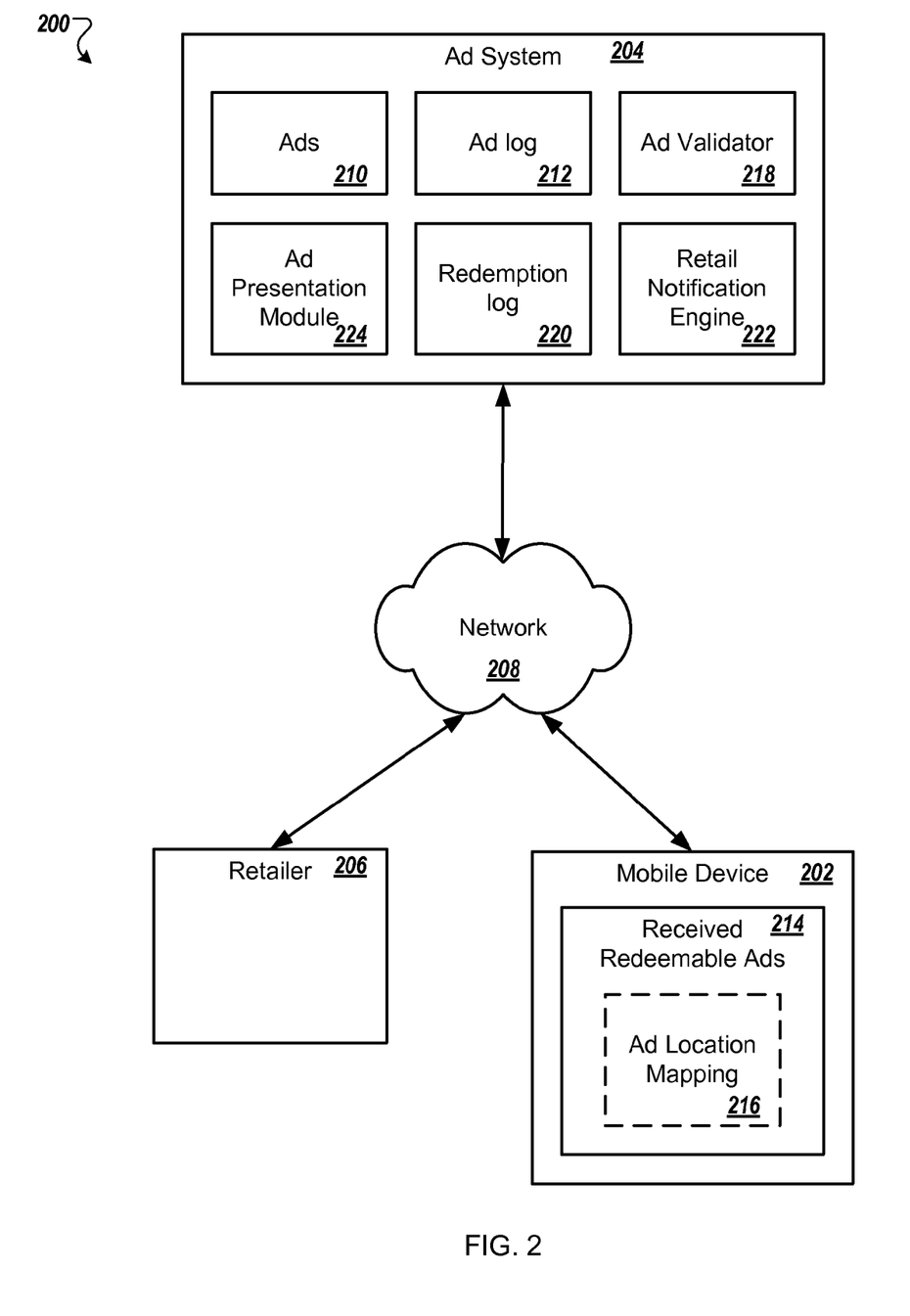
FIG. 2 is a block diagram of an example system for processing ad redemptions.

FIG. 2 is a block diagram of an example system 200 for processing ad redemptions. The system 200 is used for redeeming ads, for example, where an ad is presented to a user on a computing device and the user redeems the ad in a physical location, e.g., a retail store location. The ad can be redeemed for a benefit (e.g., a discount or free products or services) when the user visits the retail store and, for example, purchases a product or service at the retail store. In some implementations, redemption of the ad allows the user to participate in a survey. The physical redemption location can include, for example, a retail store, a restaurant, a kiosk, a boutique, a wholesaler, a vendor at a park, or an entertainment attraction.

The system 200 includes a mobile device 202 that can present content to a user. In some implementations, the mobile device 202 is a cellular telephone, a personal digital assistant, a tablet PC, or a netbook. While the mobile device 202 is shown, in some implementations, other devices can be used, for example, a laptop, a desktop computer, an Internet kiosk, a server, or a television with a set-top box. The mobile device 202 can include a web browser and other applications, e.g., news applications, email applications, games, or utilities.

The mobile device 202 can request content from an ad system 204. The ad system 204 can provide the requested content to the mobile device 202 along with ads for a retailer 206. The mobile device 202 can request and receive content from the ad system 204 through a network 208. The network 208 can be the Internet, a LAN, a WAN, or any combination thereof. In some implementations, the mobile device 202 can communicate with the ad system 204 through the network 208 using a type of wireless protocol, e.g., IEEE 802.11, WAP and/or Bluetooth. In some other implementations, the mobile device 202 is coupled to the network 208 using one or more physical cables (e.g., when the mobile device 202 is a desktop computer).

The retailer 206, directly or indirectly (e.g., through an advertiser), can provide one or more ads 210 to the ad system 204. The ads 210 can include content from other retailers, content providers, publishers, or advertisers in addition to the retailer 206. Each of the ads 210 can contain an identification of the particular retailer or retailers associated with the ad. The retailer 206 can provide the ads 210 to the ad system 204 through the network 208.

The ads 210 can include redeemable ads, e.g., coupons, tickets, or electronic documents that provide discounts or free products or services at the retailer 206. The ads 210 can promote products or services for purchase at the location of the retailer 206. The ads 210 can include redeemable promotional media for participation in surveys, discussion groups, or questionnaires at the retailer 206.

The mobile device 202 can request content (e.g., a web page, search results, or application content) from a publisher (e.g., a web page, search results) while additionally requesting one or more ads from the ad system 204. The ad system 204 can provide the requested ads to the mobile device 202. In some implementations, the publisher provides the requested content to the mobile device 202 and the mobile device 202 can combine the requested content with the one or more ads received from the ad system 204. The mobile device 202 can display the requested content with the received ads on a display. The requested content can be presented on the mobile device 202, for example, in a web browser or an application on the mobile device 202.

In some implementations, the mobile device 202 receives ads with the requested content. For example, the publisher can receive ads from the ad system 204, which are then integrated into the content provided by the publisher (e.g., within a publisher's web page).

An ad presentation module 224 can determine which of the ads 210 to serve to the mobile device 202 with the requested content. The ads 210 can be selected and scored based on different criteria in order to match the ads 210 with the requested content and/or the requesting user. For example, the ad presentation module 224 can identify ads based on keywords associated with the ads that correspond with the requested content in which the ads are to be presented. In another example, the ad presentation module 224 uses information about the user (e.g., user profile information) to identify ads. In another example, the ad presentation module 224 can send a business application ads based on the specific business application requesting the ads (e.g., the ads are for products or services that appeal to a typical user of the business application).

The ad system 204 can track presentation of the ads 210 to the user in an ad log 212. Each record in the ad log 212 can include, for example, an ad identifier, an identifier for the user (e.g., a user identifier, profile identifier, device identifier), a time stamp for each particular presentation of the ad, the type of ad (e.g., redeemable or non-redeemable), etc.

The user can save redeemable ads presented on the mobile device 202 to a received redeemable ads repository 214 by selecting a "save to my mobile device" option. Alternatively, redeemable ads can be automatically saved to the received redeemable ads repository 214 without user interaction. The user can later use a mobile application to redeem ads stored in the received redeemable ads repository 214 at a retail store. The received redeemable ads repository 214 can be included locally on the mobile device 202. Alternatively, the received redeemable ads repository 214 can be located remotely in a user account on the ad system 204 or a server.

For example, redeemable ads presented to the user on the mobile device 202 can be stored in a user account on a server. Redeemable ads presented to the user on other devices (e.g., the user's home computer or a friend's computer) can also be stored in the user's account on the server. When the user is at a retailer, the user can remotely access the redeemable ads stored in the user's account with the mobile device 202 (e.g., through a browser session or using a particular application on the mobile device 202) and redeem an ad at the retailer.

In some implementations, a mobile application on the mobile device 202 is used to manage redeemable ads. The mobile application can store the redeemable ads locally in the received redeemable ads repository 214. Alternatively, the mobile application can store the ads remotely on a server and access the server in order to redeem one of the ads. The mobile application can be used to organize ads (e.g., discard ads for products or services the user is not interested in), present ads to the retailer 206, and manage redemption of ads with the ad system 204. In some implementations, a desktop application on the user's home computer also allows the user to organize ads stored on the server.

In some implementations, an ad location mapping repository 216 associates redemption locations with ads stored in the received redeemable ads repository 214. A redemption location is a particular geographic location associated with a retailer (e.g., the retailer 206) where an ad can be redeemed. A redemption location can be defined, for example, by GPS (Global Positioning Satellite) coordinates (e.g., latitude and longitude), a street address, a street intersection, or a region surrounding particular GPS coordinates. A region can be defined as an area within a particular distance (e.g., one hundred feet) of particular GPS coordinates.

As another example, a redemption location can be a semantic location or a region surrounding a semantic location. A semantic location can be, for example, a shopping mall, a park, a landmark, or some other area of interest. Since one dimension (e.g., width) of a semantic location area such as a shopping mall can be a distance of several hundred feet (or several city blocks), particular GPS coordinates can be considered to be in a region surrounding a semantic location if the GPS coordinates represent a location within a certain distance (e.g., one hundred feet) outside of a boundary of the semantic area. Thus, for each redemption location the ad location mapping repository 216 identifies the corresponding ad or ads with that location.

If the mobile device 202 is within a specific proximity of a geographic location associated with an ad in the received redeemable ads repository 214, the user can be prompted to redeem the ad (e.g., by an ad management application on the mobile device 202 that includes the association of received ads and locations). For example, the mobile application can determine the GPS coordinates of the mobile device 202. The mobile application can compare the GPS coordinates of the mobile device 202 with GPS coordinates stored in the ad location mapping repository 216. If the mobile application determines that the GPS coordinates of the mobile device 202 are within a specific proximity of a set of GPS coordinates stored in the ad location mapping repository 216, the mobile application can display a prompt for the ad associated with the set of GPS coordinates. For example, the prompt can be presentation of the associated ad or a summary of the associated ad to the user.

When the user is at the retailer 206 (e.g., a physical retail store location), the user can redeem an ad from the received redeemable ads repository 214. An ad can be presented to the user based on the user's geographical location as described above. Alternatively, the user can browse through the ads stored in the received redeemable ads repository 214 to select an ad. The user can present the ad to a cashier at the retailer 206. The user can select a "redeem" option to activate the ad and provide the ad identifier of the ad and a user identifier to the ad system 204.

An ad validator 218 can be used to validate the activated ad. For example, the ad validator 218 can verify that the ad has not expired, the ad has not been modified (e.g., the details of the ad are the same as when the ad was presented on the mobile device 202), and/or the ad has not been used previously or more than an allowed number of times. The ad validator 218 can query a redemption log 220 with the ad identifier and the user identifier to determine if the user has previously redeemed the ad. If the ad is valid for redemption, the ad validator 218 can create a new record in the redemption log 220 for the ad (e.g., with the ad identifier, the user identifier, and a time of redemption).

The redemption log 220 can track physical location based (e.g., offline) ad redemptions, online ad redemptions, or both. The redemption log 220 and the ad log 212 can be used to determine ad conversions. The ad system 204 can track redemptions to generate statistics on the effectiveness of ads and to allow for ad accounting (e.g., payments based on redemptions).

In some implementations, the user can redeem an ad multiple times. For example, the ad can be redeemed five times. The ad can include indication (e.g., text) of the total number of times the ad can be redeemed or the remaining number of times the ad can be redeemed. In another example, the ad can include indication that the ad can be redeemed a specific number of times during a certain time period (e.g., once every two weeks).

Once an ad has been validated, a retail notification engine 222 can provide information (e.g., an ad identifier) regarding the ad to the retailer 206. For example, the retail notification engine 222 can identify the particular retailer associated with the ad that is being redeemed. The retail notification engine 222 can identify the particular retailer based on retailer information in the ads 210 or information associated with the redeemed ad. In some implementations, the retail notification engine 222 uses the current geographical location of the mobile device 202 to identify a particular retail store for a retailer with multiple store locations. In some implementations, the advertiser can indicate particular retail store addresses in which the ad is valid for redemption. The ad can specify the particular locations corresponding to the valid addresses. The user location at the time of redemption can be used to identify the user's proximity to one of the advertiser specified locations and to track the particular store at which the ad was redeemed.

The retail notification engine 222 can provide indication of the specific benefit advertised in the ad to the retailer 206. For example, the retailer 206 can include software associated with the retailer's ad system account. The software can receive indication of the redeemed ad and present the ad benefit on a display in a point of sale system operated by the cashier. In some implementations, the software verifies that the user's purchase meets the requirements of the benefit (e.g., minimum purchase amount, purchase of specific products or services) before displaying the ad benefit on the point of sale system display.

The cashier can accept the redemption of the ad causing the benefit (e.g., discount) to be applied to the user's purchase. In some implementations, the display presents multiple ads being redeemed at the retailer 206 at the same time (e.g., all of the ads being redeemed at the retailer 206). For example, the display can present the ads being redeemed at the retailer 206 that have requirements met by the user's purchase. The cashier can accept redemption of the ad or ads that were presented to the cashier on the mobile device 202.

In some implementations, the mobile device 202 communicates with the point of sale system at the retailer 206 before redeeming an ad. For example, the mobile device 202 can communicate wirelessly with the point of sale system in order to receive an identifier of the point of sale system. The mobile device 202 can provide the point of sale system identifier to the ad system 204 along with the ad identifier and user identifier. In some implementations, a particular redemption code is associated with each ad. The code can be used both to identify the ad as well as the user that received the ad. The ad validator 218 can use the point of sale system identifier to verify that the user is at a retail location associated with the ad being redeemed.

The retail notification engine 222 can use the point of sale system identifier to provide indication of the ad benefit to the specific point of sale system at the retailer 206 where the user is purchasing products or services. The cashier at the specific point of sale system can view the ad benefit and accept redemption of the ad. In some implementations, the point of sale system receives indication of the advertised benefit, automatically verifies that the user's purchase meets the requirements of the benefit, and applies the benefit to the purchase without input from the cashier.

In some implementations, a record is not created in the redemption log 220 until the user's transaction is completed (e.g., the user has paid for the purchase). For example, the software at the retailer 206 can provide verification of the redemption to the retail notification engine 222 after the transaction is completed. The retail notification engine 222 can create a record in the redemption log 220 with the time stamp of the redemption, the ad identifier, and the user identifier. In some implementations, the record includes the point of sale system identifier.

In some implementations, an ad is removed from the received redeemable ads repository 214 after the ad has been redeemed. The ad can be removed from the received redeemable ads repository 214 after notification about the ad being redeemed is provided to the ad system 204. Alternatively, the ad can be removed from the received redeemable ads repository 214 after a record is created in the redemption log 220. For example, the ad validator 218 or the retail notification engine 222 can create a record logging the redemption in the redemption log 220. The ad system 204 can send a message to the mobile device 202 indicating that the ad redemption has been logged and the mobile device 202 can remove the ad from the received redeemable ads repository 214. The ad can be removed from storage locally on the mobile device 202 or remotely in a user account on a server.

In one example, a news application on the mobile device 202 can request an ad from the ad system 204. The ad system 204 can provide an ad to the news application in response to the request. The news application can store the received ad in the received redeemable ads repository 214. An ad management application on the mobile device 202 can receive indication of the current geographic location of the mobile device 202. The ad management application can determine that the current geographic location is within a predetermined distance (e.g., user specified) of a geographic location associated with an ad in the received redeemable ads repository 214.

A prompt can be presented on the mobile device 202 by the ad management application indicating that the ad can be redeemed at a restaurant nearby. The mobile device 202 can receive user input indicating selection of the ad and the ad management application can present the details of the ad on the mobile device display. In some implementations, the user can show the selected ad to a staff member at the restaurant during checkout.

Continuing the example, the mobile device 202 can receive input from an accelerometer indicating that the mobile device 202 is being shaken. The ad management application can receive the input from the accelerometer and activate the selected ad. The ad management application can provide a message to the ad system 204 requesting redemption of the ad. The message can include an identifier for the ad and an identifier for the user. The ad validator 218 can authenticate the ad. If the ad validator 218 verifies that the ad can be redeemed, the retail notification engine 222 can provide a message to the restaurant indicating the ad for redemption. The retail notification engine 222 can update a record in the redemption log 220 with the time stamp of the redemption. The ad management application can stop presenting the ad on the mobile device display.

Figure 3:
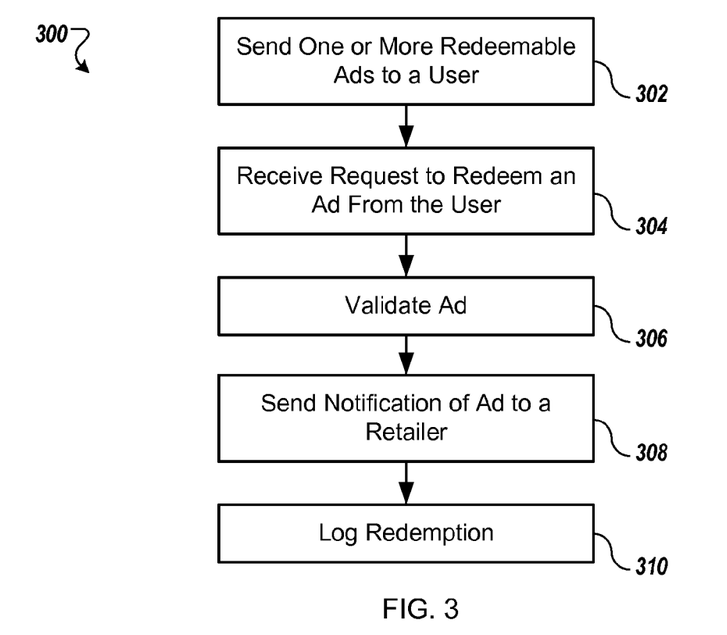
FIG. 3 is a flow chart of an example method for validating and redeeming an ad.

FIG. 3 is a flow chart of an example method 300 for validating and redeeming an ad. An ad system (e.g., the ad system 204) and parts thereof will be referred to in the following as examples. The method 300 can be performed by one or more other systems in conjunction with or instead of the ad system.

One or more redeemable ads are sent to a user (302). For example, the ad system can receive a request for content (e.g., an ad) from a mobile device (e.g., the mobile device 202). The ad system can provide one or more ads (e.g., from the ads 210) to the mobile device with the requested content. The one or more ads can include redeemable ads or a combination of redeemable ads and non-redeemable ads. The one or more ads can be sent to the mobile device at the same time (e.g., after a single request for content from the mobile device). Alternatively, the one or more ads can be sent to the mobile device over a period of time (e.g., a single ad can be sent to the mobile device for each content request and the ad system can receive the content requests over a period of days, weeks, etc.).

In some implementations, the ads can be sent to multiple devices associated with the user by a user account. For example, the user account can be on an ad storage server that saves the redeemable ads presented on the multiple devices.

A request is received from the user to redeem an ad (304). For example, the ad system can receive a message from the mobile device indicating that the user has activated a particular ad for redemption. The ad can be an ad stored locally on the mobile device (e.g., in the received redeemable ads repository 214). Alternatively, the ad can be stored remotely on a server accessible to the mobile device. The message includes an identifier of the particular ad the user is redeeming. The message can include an identifier of the user for tracking ad conversions and redemptions.

In some implementations, the message includes geographical location information for a particular store the ad is being redeemed at (e.g., if the ad is redeemable at a chain of stores). For example, the message can include the GPS coordinates of the mobile device or a street intersection close to the geographical location of the mobile device. The ad system can use the GPS coordinates to identify the particular retail store.

The ad is validated (306). For example, an ad validator (e.g., the ad validator 218) can determine if the user can redeem the ad. The ad validator can confirm that the current date is before an expiration date of the ad. The ad validator can make sure that the ad has not been redeemed more than an advertised number of times. For example, if the ad can be redeemed five times, the ad validator confirms that the user has redeemed the ad less than five times so far. In another example, the ad can only be redeemed once, and the ad validator confirms that the ad has not already been redeemed.

In some implementations, the ad validator confirms that the user can redeem the ad at a retailer. For example, the ad validator sends a message to the particular retail store the user is located at and confirms that the user is purchasing products or services advertised in the ad and can receive the benefit advertised in the ad.

In some implementations, the ad validator confirms that the ad is available for redemption. For example, the ad validator confirms that the ad details have not been modified or the ad has not already been redeemed. In another example, the ad validator determines that the ad was presented on the user's mobile device or another device associated with the user and not a device associated with another user.

A notification of the ad is sent to a retailer (308). For example, if the ad is valid for redemption, a retail notification engine (e.g., the retail notification engine 222) can identify the retailer (e.g., the retailer 206) associated with the ad. The retail notification engine can send the notification to the retailer indicating that the ad is being redeemed.

When the request to redeem the ad includes geographical location information, the retail notification engine can send the notification indicating that the ad is being redeemed to the identified particular retail store. In particular, the notification can indicate a redemption amount (e.g., discount or other benefit, for example, as identified by the ad) to be applied to a pending transaction at the retailer (e.g., the current user transaction at the retailer).

The ad redemption is logged (310). For example, the ad system can log the redemption in a redemption log (e.g., the redemption log 220). The ad system can create a new record in the redemption log with the ad identifier and a time stamp of the redemption. The new record can include a user identifier, and/or a store identifier.

In some implementations, for ads that can be redeemed multiple times, the ad system updates the record in the redemption log associated with the ad identifier. The ad system can also use the user identifier to determine the record to update. The updated record can include information regarding the new ad redemption (e.g., the timestamp of the redemption and/or the location of the redemption).

Figure 4:
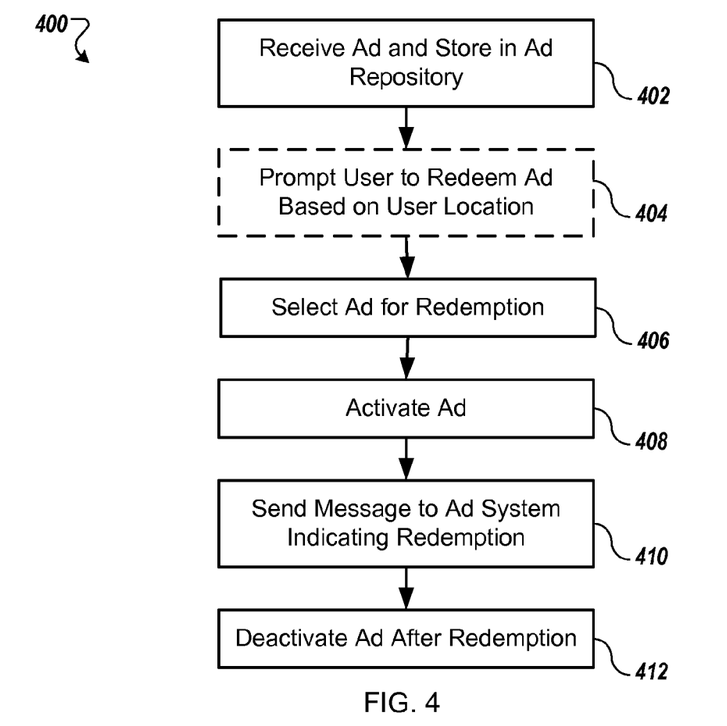
FIG. 4 is a flow chart of an example method for redeeming an ad.

FIG. 4 is a flow chart of an example method 400 for redeeming an ad. A mobile device (e.g., the mobile device 202) and parts thereof will be referred to in the following as examples. The method 400 can be performed by one or more other systems in conjunction with or instead of the mobile device.

An ad is received and stored in an ad repository (402). For example, the mobile device can request and receive the ad from an ad system (e.g., the ad system 204). The mobile device can present the ad on a mobile display to a user. A mobile application on the mobile device can store the ad in a repository on the mobile device (e.g., the received redeemable ads repository 214) or on a server.

In some implementations, the user of the mobile device can view ads on computing devices other than the mobile device (e.g., a work computer). In this example, ads received by the mobile device and the other computing devices can be stored on a remote repository (e.g., on a server) accessible by the mobile device and the other computing devices.

A user is optionally prompted to redeem an ad based on the user's location (404). For example, the mobile application can determine the mobile device's geographical location. The mobile application can compare the mobile device's geographical location with geographical locations associated with the ads stored in the repository. If the mobile device's geographical location is within a specific proximity of a geographical location associated with an ad stored in the repository, the mobile application can prompt the user to redeem the ad. For example, the mobile application can alert the user that they can redeem the ad at a store or restaurant nearby.

In some implementations, the user is prompted when the mobile application detects that the mobile device has been at the same geographical location associated with an ad for at least a threshold number of minutes (e.g., ten).

In some implementations, the mobile application can detect the user's current or prospective location based on a calendar entry (e.g., "Attend concert at the Target Center") or the user's social networking status (e.g., "Going to Babalu Restaurant"). For example, the mobile device can receive the user's current location from an update sent to a social networking site and prompt the user to redeem an ad associated with the user's current location. In another example, the mobile application can provide the user with information regarding ads the user can redeem at geographical locations close to the user's destination (e.g., a location the user will be at in five minutes).

An ad is selected for redemption (406). For example, a touch sensitive display on the mobile device can receive user selection of an ad. For example, the user can select an ad in response to a prompt or though a manual search of the ad repository. After selection, details of the ad can be presented on the touch sensitive display. Selection of the ad can present the ad more prominently on the touch screen display. For example, the mobile application can present the ad on the display with no other content. In some implementations, the mobile application can receive input indicating de-selection of the ad if it is not the ad the user was looking for.

The mobile application can display the ads stored in the repository on the touch sensitive display allowing the user to browse the ads and select an ad. Alternatively, the mobile application prompts the user to redeem an ad and can receive user selection of the ad displayed in the prompt. In some implementations, the mobile application can receive user selection of an ad from other input devices including a microphone (e.g., by voice activation), a keyboard/touch screen, a trackball, or other buttons on the mobile device.

In some implementations, the mobile application queries the repository for a subset of ads. For example, the mobile application can send a request to the repository for all of the ads associated with retailers in a mall the user is currently visiting. The mobile application can present the subset of ads on the touch screen display and receive user selection of one of the presented ads.

The ad is activated (408). For example, the mobile application receives input indicating user selection of an "activate" button in the ad presented on the touch sensitive display. In some implementations, the mobile application determines that a shaking motion of the mobile device indicates activation of the selected ad.

A message is sent to an ad system indicating redemption (410). For example, the mobile application can send a message to the ad system indicating that the user is redeeming the ad at a retailer. The message includes an identifier of the ad. The message can include a user identifier, a geographical position of the mobile device, and/or a store identifier for the retail store where the user is redeeming the ad.

The ad is deactivated after redemption (412). For example, the ad is not longer presented on the mobile device. The mobile application can increment the number of times the ad has been redeemed (e.g., by updating a value associated with the ad in the repository). In some implementations, if the number of redemptions is above a threshold value (e.g., a maximum number of redemptions) the mobile application removes the ad from the repository or otherwise indicates that the ad can no longer be redeemed. In some implementations, the mobile device receives a message from an ad system once the ad redemption has been confirmed. In response to the message, the ad is deactivated.

Figure 5:
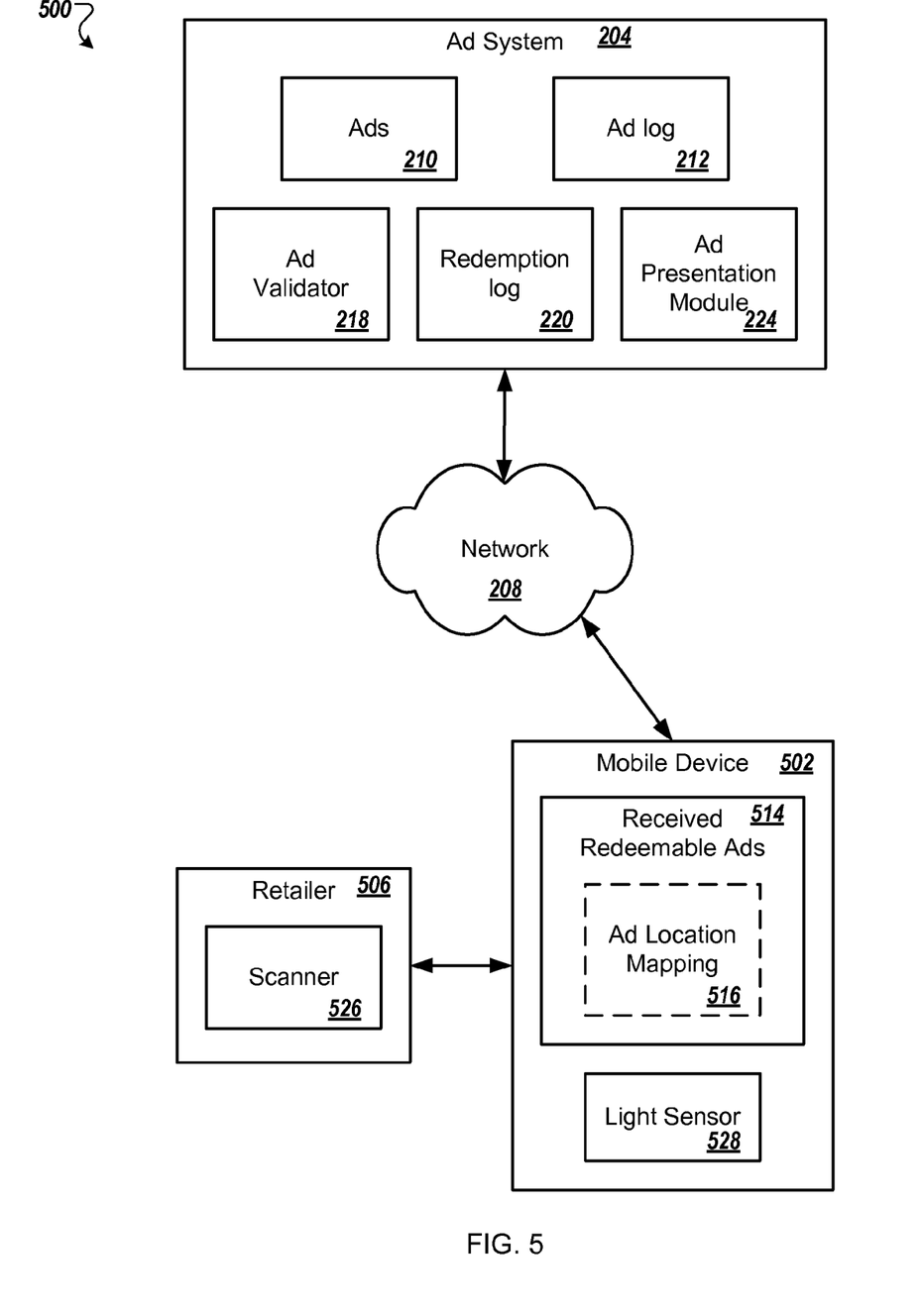
FIG. 5 is a block diagram of an example system for processing ad redemptions.

FIG. 5 is a block diagram of an example system 500 for processing redemptions. In particular, ads are redeemed using a sensor at a point of sale system (e.g., at a physical retail or point of sale location). For example, the sensor can detect information associated with an ad presented on a display of a mobile device. The mobile device sends a message to an ad system indicating that the point of sale system detected a presented ad. The ad system can log the ad redemption based on the information in the received message.

The system 500 includes a mobile device 502 for presenting content to a user. In some implementations, the mobile device 502 is the same device as the mobile device 202. In some implementations, the mobile device 502 is a cellular telephone, a personal digital assistant, a tablet PC, a netbook, or a laptop. The mobile device 502 can include a web browser and other applications, e.g., news applications, email applications, games, or utilities.

The mobile device 502 can request content from the ad system 204. For example, a web browser on the mobile device 502 can request a web page from a particular publisher that includes one or more ads. The browser can send an ad request to the ad system 204 when loading the web page. Alternatively, in some implementations, the publisher requests the ads, which are incorporated into the content prior to providing the content to the user's browser. The ad presentation module 224 can identify which of the ads 210 to serve with the requested web page. The ad system 204 can provide the requested web page and one or more of the ads 210 to the mobile device 502 through the network 208. The ads can be for products or services from a retailer 506. The ad system 204 can track ads presented on the mobile device 502 in the ad log 212. The web browser can combine the web page with the one or more ads and present the combined content on a display of the mobile device 502.

Redeemable ads can be store in a received redeemable ads repository 514 on the mobile device 502. Alternatively, the redeemable ads can be store remotely on a server accessible by the mobile device 502. The redeemable ads can be associated with one or more redemption locations stored in an ad location mapping repository 516. The ad location mapping repository 516 can include representations of the geographic locations of the retailers where the redeemable ads can be redeemed.

A mobile application can present the redeemable ads stored in the repository to a user. The user can select and activate one of the redeemable ads in order to receive a benefit of the ad while at the retailer 506. The ad can be presented on the display of the mobile device 502 based on activation of the ad.

A scanner 526 can read a bar code included in the ad presented on the mobile device display. The retailer 506 can identify the presented ad and benefits of the ad based on the bar code included in the ad. In some implementations, the presented ad can include a quick response ("QR") code or other two-dimensional bar code. The retailer 506 can apply the benefits associated with the presented ad to the user's transaction. For example, the user can receive free products or services. The retailer 506 can verify that the presented ad applies to the user's transaction before applying the benefits associated with the presented ad.

The mobile device 502 includes a light sensor 528 that can detect light made by the scanner 526 when the scanner 526 is reading the bar code in the presented ad. In some implementations, the light sensor 528 detects a specific light pattern from the scanner 526. Alternatively, the light sensor 528 can identify a particular wavelength or wavelengths of light (e.g., the red light of the scanner).

The mobile application can receive a message from the light sensor 528 indicating detection of the light or the light pattern and determine that ad redemption has taken place based on the detection of light. The mobile application can provide a message to the ad system 204 identifying the ad redemption (e.g., an ad identifier, a user identifier, etc.). The mobile application can deactivate the ad when the maximum number of redemptions of the ad is exceeded.

The ad validator 218 can validate the ad being redeemed and log the ad redemption in the redemption log 220. For example, the ad validator 218 can create a new record in the redemption log 220 with the ad identifier and the user identifier.

In some implementations, the mobile device 502 can send a copy of the ad wirelessly to a point of sale system at the retailer 506. The point of sale system can validate the ad and apply benefits from the ad to the user's transaction. The mobile device 502 or the retailer 506 can provide indication of the ad redemption to the ad system 204.

Figure 6:
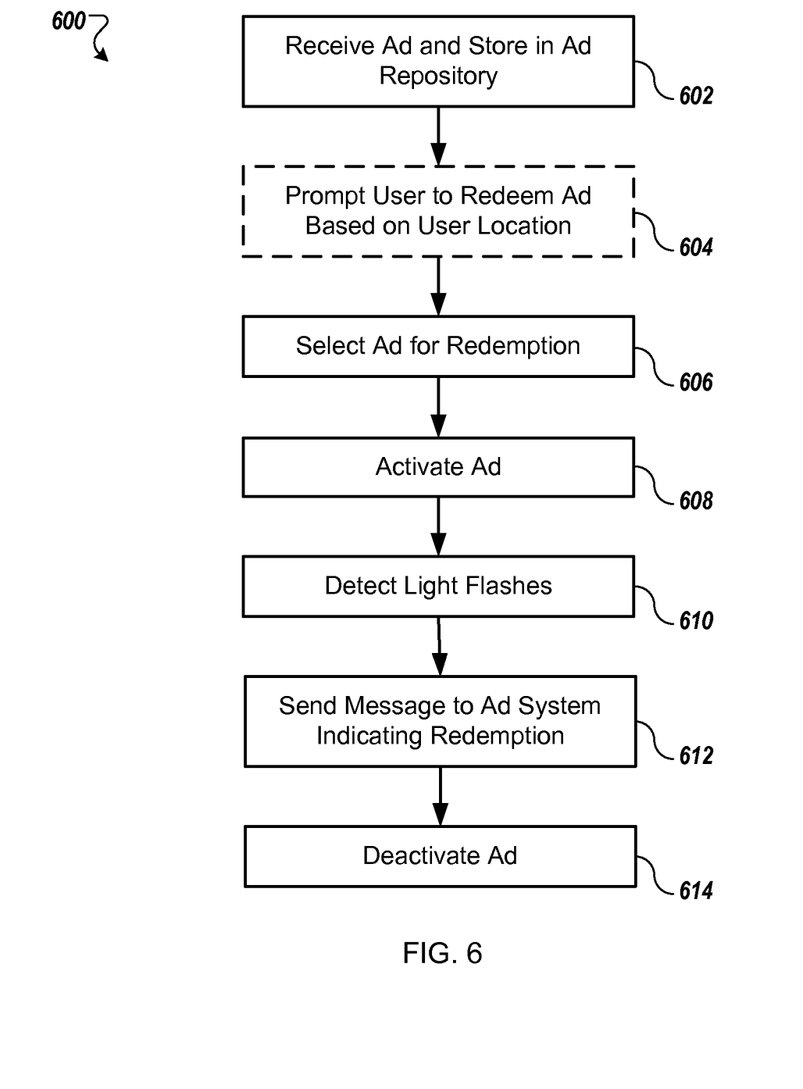
FIG. 6 is a flow chart of an example method for redeeming an ad using a sensor.

FIG. 6 is a flow chart of an example method 600 for redeeming an ad using a sensor. A mobile device (e.g., the mobile device 502) and parts thereof will be referred to in the following as examples. The method 600 can be performed by one or more other systems in conjunction with or instead of the mobile device.

An ad is received and stored in an ad repository (602). For example, the mobile device request content from an ad server (e.g., the ad system 204). The ad server provides the ad (e.g., one of the ads 210) to the mobile device with the requested content.

In some implementations, the mobile device requests content from a publisher. The publisher can serve the requested content to the mobile device and request one or more ads to be provided to the mobile device from the ad system. The ad system can provide one or more ads to the mobile device and the mobile device can combine the requested content and the ads in order to present the combined content on a display to a user. Alternatively, the ad system can send ads to the publisher for integration into the content served to the mobile device.

The presented redeemable ads can be stored a redeemable ads repository (e.g., the received redeemable ads repository 514) for later access. Alternatively, the repository can be located on a remote server.

When the ads are stored on the remote server, the user can view additional ads on devices other than the mobile device. The additional ads can also be stored on the remote server. For example, a home computer can present ads to the user and an application on the home computer can upload the presented ads to the remote server.

The ads stored in the repository on the remote server or the mobile device can be redeemable ads. In some implementations, the ads stored in the repository are a combination of both redeemable ads and non-redeemable ads.

A user is optionally prompted to redeem an ad based on the user's location (604). For example, a mobile application can receive input indicating the current geographical location of the mobile device. The mobile application can compare the current geographical location with geographical locations associated with the ads stored in the repository.

When the current geographical location is within a proximity (e.g., a threshold value stored in the mobile application) of a geographical location associated with one of the ads, the mobile application can prompt the user to redeem the ad. The mobile application can display a notification on the mobile device indicating that the ad can be redeemed at a nearby location. The notification can include options to display details about the ad or to ignore the notification.

An ad is selected for redemption (606). For example, the mobile application can receive input indicating user selection of the ad. Details about the ad can be presented on the display of the mobile device. In some implementations, the ad is presented on a particular portion of the display. In some other implementations, the ad can be presented on the entire display.

The mobile application can receive input indicating selection of the ad presented in a prompt presented to the user. Alternatively, the mobile application can display a list of the ads store in the repository. The user can browse or search through the list of ads and select an ad. If the selected ad is not the ad the user is looking for, the mobile application can receive input indicating de-selection of the ad and the user can search for another ad.

The ad is activated (608). For example, the mobile application receives indication to activate the ad and the mobile application can present the ad on the entire display of the mobile device. The presented ad includes a bar code, a QR code, or some other form of identifier. Activation of the ad can turn on a light sensor (e.g., the light sensor 528) included in the mobile device.

The ad can be activated by selection of the ad and the mobile application receiving input indicating that the mobile device is being shaken (e.g., by the user when the user reaches a checkout counter). Alternatively, the mobile application can receive input indicating the user selected an "activate" button presented on a touch screen display of the mobile device. In some other implementations, the mobile application can receive input indicating selection of the "activate" button from a keyboard, a trackball, or some other input device.

Light flashes are detected (610). For example, the light sensor can detect light flashes or a pattern of light flashes made by a scanner reading the bar code in the activated ad. Alternatively, the light sensor can detect light flashes or a pattern of light flashes made by the scanner (e.g., the scanner 526) reading a QR code presented in the activated ad.

In some implementations, the mobile device detects that a wireless signal sent to a checkout counter has been received. For example, when the ad is activated, the mobile device can provide an electronic copy of the ad wirelessly to the checkout counter indicating information about the activated ad (e.g., an ad identifier). The checkout counter can apply benefits from the activated ad (e.g., a discount) to the user's transaction and send a confirmation signal to the mobile device.

A message is sent to an ad system indicating redemption of the ad (612). For example, the mobile application can send the message to the ad system indicating an ad identifier for the activated ad. The message can include a user identifier and/or a geographical location of the mobile device. In some implementations, the checkout counter provides the message to the ad system indicating that the activated ad has been redeemed.

The ad is deactivated (614). For example, the mobile application can stop presenting the activated ad on the mobile device. The mobile application can remove the activated ad from the repository and the activated ad can no longer be used. In some implementations, the mobile application indicates that the activated ad can no longer be redeemed and keeps the activated ad in the repository. In some other implementations, the mobile application increments the number of times the activated ad has been redeemed. If the activated ad has been redeemed more than a threshold number of times, the activated ad can no longer be redeemed.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage media for execution by, or to control the operation of, data processing apparatus. The computer storage medium can be, or be included in, a computer-readable storage device, a computer-readable storage substrate, a random or serial access memory array or device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks;

and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method to validate redemption request at a retailer point of sale device comprising:
    receiving, by one or more computing devices of an ad system, a request from a user device to redeem one or more redeemable content items stored on the user device, when the user device is located at a particular physical retail location, and the one or more redeemable content items have an associated discount benefit to be applied to pending retail transaction at the particular physical retail location;
    validating, using the one or more computing devices the one or more redeemable content items in response to the received request, wherein validating includes determining whether the one or more redeemable content items are available for redemption by the user of the user device;
    if the ad system determines the content item is valid for redemption,
        identifying, by the one or more computing devices, the retailer associated with the validated one or more redeemable content items based at least in part on retailer information associated with the one or more redeemable content items, location information from the user mobile device, or a combination thereof;
    communicating, by the one or more computing devices, a validation notification to the particular physical retail location for display on a point of sale device associated with the pending retail transaction, the validation notification comprising the associated discount benefit to be applied to the pending retail transaction; and
    logging, by the one or more computing devices, a redemption of the one or more redeemable content items.

2. The method of claim 1, where the content item is an advertisement.

3. The method of claim 1, where validating the content item includes confirming that the content item has not already been redeemed.

4. The method of claim 1, where validating the content item includes confirming that the content item has not expired.

5. The method of claim 1, where validating the content item includes confirming that the content item is available for redemption.

6. A computer-implemented method comprising:
    receiving, by a mobile computing device, one or more redeemable content items and storing the one or more redeemable content items for later redemption, the one or more redeemable contents items having an associated redemption trigger defining a proximity range relative to a particular retailer geographic location;
    detecting, by the mobile computing device, location of the mobile computing device within the proximity range of the redemption trigger associated with the one or more redeemable content items stored on the mobile computing device;
    prompting, by the mobile computing device, the user to redeem the one or more content items associated with the redemption trigger;

receiving, by the mobile computing device, a user input selecting the one or more redeemable content items for redemption;

activating, by the mobile computing device, the one or more redeemable content items by communicating a redemption request to an add system associated with the one or more redeemable content items for validation; and deactivating, by the mobile computing device, the one or more redeemable content items stored on the mobile computing device.

7. The method of claim 6, where the content item is an advertisement.

8. The method of claim 6, where activating the ad includes receiving a user touch input to a presented activate button.

9. The method of claim 6, where activating the ad includes shaking a mobile device.

10. The method of claim 6, further comprising: presenting the ad for scanning.

11. The method of claim 10, where presenting the ad for scanning includes displaying a bar code associated with the content item.

12. The method of claim 6, further comprising:

detecting one or more light inputs after activating the content item, where a redemption message is transmitted following the detection of the one or more light inputs.

13. A system comprising:

a storage device; and one or more processors communicatively coupled to the storage device, wherein the processor executes application code instructions that are stored in the storage device and that cause the system to:

receive a request from a user device to redeem one or more redeemable content items, wherein the user device is at a particular physical retail location and the one or more redeemable content items have an associated discount benefit to be applied to a pending retail transaction at the particular physical retail location;

validate the one or more redeemable content items in response to the received request, wherein validating includes determining whether the content item is available for redemption by the user of the user device;

identify the retailer associated with the validated one or more redeemable content items based on at least retailer information associated with the one or more redeemable content items included in the request to redeem, location information from the user mobile device, or a combination thereof;

communicate a validation notification to the particular physical retail location for display on a point of sale device associated with the pending retail transaction, the validation notification comprising the associated discount benefit to be applied to the pending retail transaction; and log a redemption of the one or more redeemable content items.

14. The system of claim 13, where the content item is an advertisement.

15. The system of claim 13, where validating the content item includes confirming that the content item has not already been redeemed.

16. The system of claim 13, where validating the content item includes confirming that the content item has not expired.

17. The system of claim 13, where validating the content item includes confirming that the content item is available for redemption.

18. A system comprising:

a storage device;

one or more processors communicatively coupled to the storage device, wherein the processor executes application code instructions that are stored in the storage device and that cause the system to:

receive one or more redeemable content items and store the one or more redeemable content items for later redemption, the one or more redeemable content items having an associated redemption trigger defining a proximity range relative to a corresponding geographic location;

detect a location of the system within the defined proximity range of the redemption trigger associated with the one or more redeemable content items;

prompt the user to redeem the one or more redeemable content items associated with the redemption trigger;

receive a user input selecting the one or more redeemable content items for redemption;

activate the one or more redeemable content items by communicating a request to an ad system for validation, and deactivate the one or more redeemable content items.

19. The system of claim 18, where the received content items are stored in a remote location accessible by a mobile device.

20. The system of claim 18, where activating the ad includes receiving a user touch input to a presented activate button.

21. The system of claim 18, where activating the ad includes shaking a mobile device.

22. The system of claim 18, wherein the one or more processors further execute application code instructions that cause the system to present the ad for scanning.

23. The system of claim 22, where presenting the ad for scanning includes displaying a bar code associated with the content item.

24. The system of claim 18, wherein the one or more processors further execute application code instructions that cause the system to detect one or more light inputs after activating the content item, where a redemption message is transmitted following the detection of the one or more light inputs.

25. A computer program product comprising:

a non-transitory computer-executable storage device having computer readable instructions embodied thereon that when executed by a computer cause to the computer to validate redeemable content items, the computer-executable program instructions comprising:

computer-executable program instructions to receive, a request from a user device to redeem one or more redeemable content items, the user device being located at a particular physical retail location and the one or more redeemable content items having an associated discount benefit to be applied to a pending retail transaction at the particular physical retailer location;

computer-executable program instructions to validate the one or more redeemable content items in response to the received request, wherein validating includes determining whether the content item is available for redemption by the user of the user device;

computer-executable program instructions to identify the retailer associated with the validated one or more redeemable content items based at least in part on retailer information associated with the one or more redeemable content items in the received request, location information form the user mobile device, or a combination thereof;

computer-executable program instructions to communicate a validation notification to the particular physical retail location for display on a point of sale device associated with the pending retail transaction, the validation notification comprising the associated discount benefit to be applied to the pending retail transaction;

computer-executable program instructions to log the redemption of the one or more redeemable content items.

26. The computer program product of claim 25, where the content item is an advertisement.

27. The computer program product of claim 25, where validating the content item includes confirming that the content item has not already been redeemed.

28. The computer program product of claim 25, where validating the content item includes confirming that the content item has not expired.

29. The computer program product of claim 25, where validating the content item includes confirming that the content item is available for redemption.

30. A computer program product comprising, a non-transitory computer-executable storage device having computer-readable program instructions embodied thereon that when executed by a computer cause the computer to present redeemable content for redemption, the computer-executable program instructions comprising:

computer-executable program instructions to receive one or more redeemable content items and store the one or more redeemable content items for later redemption, wherein each of the one or more redeemable content items are associated with a redemption trigger defining a proximity range relative to a particular retailer geographic location;

computer-executable program instructions to detect location of a device executing the computer program product within a the defined proximity range of the redemption trigger associated with the one or more redeemable content items;

computer-executable program instructions to prompt the user to redeem the one or more content items associated with the redemption trigger;

computer-executable program instructions to receive a user input selecting the one or more redeemable content items for redemption;

computer-executable program instructions to activate the one or more redeemable content items by communicating a redemption request to an add system associated with the one or more redeemable content items; and computer-executable program instructions to deactivate the stored one or more redeemable content items.

31. The computer program product of claim 30, where the content item is an advertisement.

32. The computer program product of claim 30, where activating the ad includes receiving a user touch input to a presented activate button.

33. The computer program product of claim 30, where activating the ad includes shaking a mobile device.

34. The computer program product of claim 30, further comprising computer-executable program instructions to present the ad for scanning.

35. The computer program product of claim 34, where presenting the ad for scanning includes displaying a bar code associated with the content item.

36. The computer program product of claim 30, further comprising computer-executable program instructions detect one or more light inputs after activating the content item, where a redemption message is transmitted following the detection of the one or more light inputs.

* * * * *